United States Patent Office 3,449,332
Patented June 10, 1969

3,449,332
NOVEL METHANOBENZAZOCINES
AND PROCESSES
Frank H. Clarke, Jr., Armonk, and Fred B. Block, Hartsdale, N.Y., assignors to Geigy Chemical Corporation, Ardsley, N.Y., a corporation of New York
No Drawing. Continuation-in-part of application Ser. No. 453,472, May 5, 1965. This application Feb. 27, 1967, Ser. No. 619,016
Int. Cl. C09b 23/04; A61k 27/00; C07d 33/34
U.S. Cl. 260—240
10 Claims

ABSTRACT OF THE DISCLOSURE

Analgesic 3-cinnamyl-6-phenyl-1,2,3,4,5,6-hexahydro-2,6-methano-3-benzazocine derivatives are prepared via the reaction of an N-unsubstituted 6-phenyl-1,2,3,4,5,6-hexahydro-2,6-methano-3-benzazocine derivative and a cinnamyl chloride or cinnamyl bromide. A typical embodiment is 3-cinnamyl-6-phenyl-1,2,3,4,5,6-hexahydro-2,6-methano-3-benzazocine-8-ol.

CROSS REFERENCE

This is a continuation-in-part of copending application Ser. No. 453,472, filed May 5, 1965, now abandoned.

DETAILED DESCRIPTION

This invention relates to novel organic compounds, to novel methods for their preparation and use and to the novel intermediates prepared and employed in their preparation. In particular the present invention relates to certain 3-cinnamyl-6-phenyl-1,2,3,4,5,6-hexahydro-2,6-methano-3-benzazocines (alternatively named as 2-cinnamyl-5-phenyl-6,7-benzomorphans) and the pharmaceutically acceptable non-toxic acid addition salts thereof.

The compounds of the present invention are represented by the following structural formula:

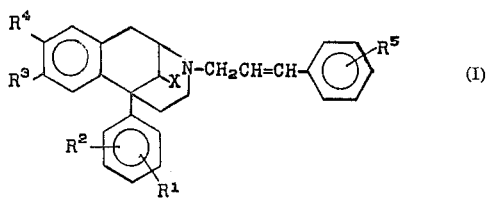

wherein each of $R^1$ and $R^2$, independent of the other is hydrogen, halogen, (lower)alkyl, (lower)alkoxy, (lower)alkanoyloxy, hydroxy or trifluoromethyl; each of $R^3$ and $R^4$, independent of the other, is hydrogen, hydroxy, (lower)alkoxy, or (lower)alkanoyloxy; $R^5$ is hydrogen, hydroxy, (lower)alkoxy, chloro, fluoro, bromo, (lower)alkyl or amino; and X is hydrogen or (lower)alkyl.

By the term "(lower)alkyl" and derivations thereof such as "(lower)alkoxy," "(lower)alkanoyloxy" and the like is intended a group comprising a branched or straight hydrocarbon chain containing from one to six carbon atoms. Representative of (lower)alkyl groups are thus methyl, ethyl, propyl, i-propyl, butyl, s-butyl, t-butyl, pentyl, isopentyl, hexyl and the like. Embraced by lower alkoxy are groups containing from one to six carbon atoms and joined through an oxygen ether bond such as methoxy, ethoxy, i-propoxy, butoxy and the like. It is to be understood that when the nature of any particular functional group in these moieties requires two carbon atoms, the hydrocarbon portion of the moiety will have from two to seven carbon atoms. Thus "(lower)alkanoyloxy" is typified by acetoxy, propanoyloxy, butanoyloxy, pentanoyloxy, hexanoyloxy and the like.

With greater particularity to Formula I, the phenyl group in the 6 position of the fundamental benzazocine nucleus may be unsubstituted, e.g., $R^1$ and $R^2$ are both hydrogen; monosubstituted, e.g., one of $R^1$ and $R^2$ is hydrogen and the other is a group other than hydrogen; or disubstituted, e.g., both $R^1$ and $R^2$ are groups other than hydrogen. $R^1$ and $R^2$ may be but are not necessarily the same.

Similarly the groups designated by $R^3$ and $R^4$ in the benzo moiety of the fundamental benzazocine nucleus may be the same or different groups. While both may be hydrogen, the preferred embodiment is characterized by $R^3$ being hydroxy or a derivative thereof, e.g., alkoxy or alkanoyloxy, and $R^4$ being hydrogen. Other combinations, however, falling within the scope of Formula I are also contemplated.

X may be hydrogen or (lower)alkyl, preferably methyl, although any alkyl group of from one to six carbon atoms as described above is embraced. The alkyl group may be of the axial or equatorial orientation.

The cinnamyl group is of the cis or trans configuration and may be substituted hydroxy, alkoxy, chloro, fluoro or alkyl.

The compounds of the present invention possess analgesic and antitussive activity. Moreover, under suitable conditions, the compounds of the present invention demonstrate narcotic antagonism.

These compounds may be administered parenterally or orally for the treatment of pain in any of the usual pharmaceutical forms including tablets, capsules, powders, suspensions, solutions, syrups and the like. Particularly valuable formulations include sustained release preparations which may be compounded by any of the known procedures. Generally these compounds are effective in effecting analgesia at a dosage of from about .1 to about .5 mg. per kg. of body weight. As with any analgesic agent, the dosage should be adjusted to the severity of the indication and the degree of response. Moreover, the dose may be repeated as appropriate depending upon the nature of the particular formulation, the response and the condition of the patient.

Since the compounds of the instant invention possess an amino group, various obvious derivatives may be made without departing from the spirit of the present invention. For example, various quaternary salts such as the methiodide may be prepared. So, too, the N-oxides of the instant compounds demonstrate important properties.

A particularly valuable embodiment of the present invention includes the acid addition salts prepared from pharmaceutically acceptable non-toxic acids. Such pharmaceutically acceptable non-toxic acid addition salts include those derived from organic and inorganic acids such as, without limitation, hydrochloric, hydrobromic, sulfuric, phosphoric, methanesulfonic, acetic, lactic, succinic, malic, maleic, aconitic, phthalic, tartaric, embonic and like acids.

The compounds of the present invention are prepared by treating a compound of the formula:

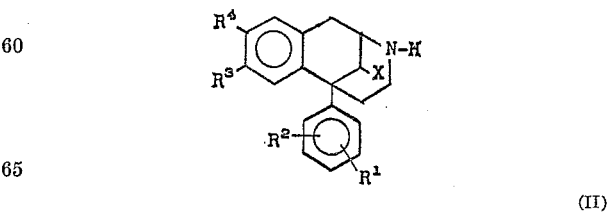

with cinnamyl bromide or cinnamyl chloride in the presence of an acid binding agent, such as an alkali bicarbonate, in an inert, nonaqueous, organic solvent such as dimethylformamide at elevated temperatures, e.g., at reflux temperatures.

The requisite starting materials of Formula II may be prepared according to the procedures described in Ser. No. 322,063, filed Nov. 7, 1963, now U.S. Patent 3,320,265.

Alternatively a compound of Formula II is treated with an acid chloride of an appropriately substituted cinnamic acid and the resulting amide then reduced with a metal hydride such as lithium aluminum hydride.

As can be seen from Formula I, the compounds of the present invention may exist in at least two optical isomers. Thus the presence of an "asymmetric" carbon atom in the benzazocine nucleus results in the existence of d- and l- optical isomers. In addition, when X in Formula I is alkyl, stereoisomers are possible, the alkyl group being cis or trans to the phenyl group in position 6. Still further isomeric forms exist depending upon the configuration of the cinnamyl group. In each of these instances however, the geometric or steroisomers are obtained via use of the appropriate starting material or a mixture of isomers is separated by taking advantage of differences in their properties, e.g., by fractional crystallization or distillation. When it is desirable to resolve enantiomorphs the standard formation or diasterioisomeric sales by the use of an optically active acid is employed. All such isomeric forms are within the purview of the present invention (including the d- and l-forms of each of the α(cis) and β(trans) isomers when X is alkyl).

The following examples, presented for purposes of illustration and not limitation, will serve to further typify the nature of this invention.

Example 1.—d,1-3-cinnamyl-6-phenyl-1,2,3,4,5,6-hexahydro-2,6-methano-3-benzazocine-8-ol A mixture of 4.00 g. (1.51 mmole) of d,1-6-phenyl-1,2,3,4,5,6-hexahydro-2,6-methano-3-benzaocine - 8 - ol, 1.52 g. (1.8 mmole) of sodium bicarbonate and 3.57 g. (1.8 mmole) of freshly distilled cinnamyl bromide in 50 ml. dimethylformamide is refluxed four hours.

The cooled thin slurry is taken to dryness in vacuo and the residue treated with 25 ml. chloroform and 25 ml. 2 N HCl. The resulting solid is filtered. Yield of desired product for one experiment was 3.58 g., 57%, M.P. 190–260°.

The solid is slurried in ether and rendered acidic to congo red indicator with ethanolic hydrogen chloride. In one experiment 3.45 g., 55%, of material melting 263–5° were isolated. Two recrystallizations from methanol yielded 1.43 g., 23%, of d,1-3-cinnamyl-6-phenyl-1,2,3,4,5,6-hexa-hydro-2,6-methano-3-benzazocine - 8 - ol hydrochloride, M.P. 274–7° C.

In a similar fashion employing the resolved enantiomorphs of 6-phenyl-1,2,3,4,5,6-hexahydro-2,6-methano-3-benzazocine-8-ol, there are respectively obtained d-3-cinnamyl - 6 - phenyl-1,2,3,4,5,6-hexahydro-2,6-methano-3-benzazocine-8-ol and 1-3-cinnamyl-6-phenyl-1,2,3,4,5,6-hexahydro-2,6-methano-3-benzazocine-8-ol.

An equivalent amount of cinnamyl chloride is alternatively employed in the foregoing procedure.

Example 2

In a similar fashion to that described in Example 1, the following compounds are substituted for 6-phenyl-1,2,3,4,5,6-hexahydro-2,6-methano-3-benzazocine-8-ol:

6-(4-chlorophenyl)-1,2,3,4,5,6-hexahydro-2,6-methano-3-benzazocine-8-ol;
6-(4-hydroxyphenyl)-1,2,3,4,5,6-hexahydro-2,6-methano-3-benzazocine-8-ol;
6-(2,3-dimethoxyphenyl)-1,2,3,4,5,6-hexahydro-2,6-methano-3-benzazocine;
6-(3,4-dihydroxyphenyl)-1,2,3,4,5,6-hexahydro-2,6-methano-3-benzazocine;
6-(3-trifluoromethylphenyl)-1,2,3,4,5,6-hexahydro-2,6-methano-3-benzazocine-8-ol;
6-(4-methylphenyl)-1,2,3,4,5,6-hexahydro-2,6-methano-3-benzazocine-8-ol;
6-phenyl-11-methyl-1,2,3,4,5,6-hexahydro-2,6-methano-3-benzazocine;
6-phenyl-8-methoxy-11-methyl-1,2,3,4,5,6-hexahydro-2,6-methano-3-benzazocine;
6-phenyl-11-methyl-1,2,3,4,5,6-hexahydro-2,6-methano-3-benzazocine-8-ol;
6-phenyl-8-methoxy-1,2,3,4,5,6-hexahydro-2,6-methano-3-benzazocine; and
6-phenyl-1,2,3,4,5,6-hexahydro-2,6-methano-3-benzazocine.

There are thus respectively obtained the following compounds:

3-cinnamyl-6-(4-chlorophenyl)-1,2,3,4,5,6-hexahydro-2,6-methano-3-benzazocine-8-ol;
3-cinnamyl-6-(4-hydroxyphenyl)-1,2,3,4,5,6-hexahydro-2,6-methano-3-benzazocine-8-ol;
3-cinnamyl-6-(2,3,-dimethoxyphenyl)-1,2,3,4,5,6-hexahydro-2,6-methano-3-benzazocine;
3-cinnamyl-6-(3,4-dihydroxyphenyl)-1,2,3,4,5,6-hexahydro-2,6-methano-3-benzazocine-8-ol;
3-cinnamyl-6-(3-trifluoromethylphenyl)-1,2,3,4,5,6-hexahydro-2,6-methano-3-benzazocine-8-ol;
3-cinnamyl-6-(4-methylphenyl)-1,2,3,4,5,6-hexahydro-2,6-methano-3-benzazocine-8-ol;
3-cinnamyl-6-phenyl-11-methyl-1,2,3,4,5,6-hexahydro-2,6-methano-3-benzazocine;
3-cinnamyl-6-phenyl-8-methoxy-11-methyl-1,2,3,4,5,6-hexahydro-2,6-methano-3-benzazocine;
3-cinnamyl-6-phenyl-11-methyl-1,2,3,4,5,6-hexahydro-2,6-methano-3-benzazocine-8-ol;
3-cinnamyl-6-phenyl-8-methoxy-1,2,3,4,5,6-hexahydro-2,6-methano-3-benzazocine; and
3-cinnamyl-6-phenyl-1,2,3,4,5,6-hexahydro-2,6-methano-3-benzazocine.

Example 3.—3-(4-fluorocinnamyl)-6-phenyl-1,2,3,4,5,6-hexahydro-2,6-methano-3-benzazocine-8-ol 4-fluorocinnamic acid (0.2 mole) is allowed to react overnight at room temperature with 110 ml. of thionyl chloride. The reaction mixture is then evaporated in vacuo at about 35° C. and to the residue are added 250 ml. of benzene. The evaporation is repeated and the residue comprising 4-fluorocinnamic acid chloride is held under vacuum to remove any traces of thionyl chloride.

To 1.2 g. of 6-phenyl-1,2,3,4,5,6-hexahydro-2,6-methano-3-benzazocine-8-ol, 25 ml. of dimethylformamide, 4.0 ml. of water and 1.31 g. of potassium carbonate at 100° C. are added 1.6 ml. of 5-fluorocinnamic acid chloride over a 15 minute period. The reaction mixture is then heated at 120°–125° C. for 3 hours, diluted with 50 ml. of water and extracted three times with 75 ml. portions of 2:1 butanol benzene. The combined extracts are washed with dilute hydrochloric acid and then with water and dried over sodium sulfate. The residue obtained after evaporation is then treated with excess lithium aluminum hydride in tetrahydrofuran and refluxed for 15 hours. This reaction mixture is cooled in an ice bath, cautiously treated with saturated sodium chloride solution and filtered. Evaporation of the filtrate yields 3-(4-fluorocinnamyl) - 6 - phenyl-1,2,3,4,5,6-hexahydro-2,6-methano-3-benzazocine-8-ol which is further purified through recrystallization from methanol.

In a like fashion employing 3-fluorocinnamic acid, 4-methoxycinnamic acid, 4-methylcinnamic acid, 4-hydroxycinnamic acid, 4-chlorocinnamic acid and 4-nitrocinnamic acid, the following compounds are respectively obtained:

3-(3-fluorocinnamyl)-6-phenyl-1,2,3,4,5,6-hexahydro-2,6-methano-3-benzazocine-8-ol;
3-(4-methoxycinnamyl)-6-phenyl-1,2,3,4,5,6-hexahydro-2,6-methano-3-benzazocine-8-ol;
3-(4-methylcinnamyl)-6-phenyl-1,2,3,4,5,6-hexahydro-2,6-methano-3-benzazocine-8-ol;

3-(4-hydroxycinnamyl)-6-phenyl-1,2,3,4,5,6-hexahydro-2,6-methano-3-benzazocine-8-ol;
3-(4-chlorocinnamyl)-6-phenyl-1,2,3,4,5,6-hexahydro-2,6-methano-3-benzazocine-8-ol; and
3-(4-nitrocinnamyl)-6-phenyl-1,2,3,4,5,6-hexahydro-2,6-methano-3-benzazocine-8-ol.

Example 4.—3-(4-aminocinnamyl)-6-phenyl-1,2,3,4,5,6-hexahydro-2,6-methano-3-benzazocine-8-ol A mixture of 4 g. of 3-(4-nitrocinnamyl)-6-phenyl-1,2,3,4,5,6-hexahydro - 2,6 - methano-3-benzazocine-8-ol, and 4 g. of iron filings and 40 ml. of 6 N hydrochloric acid is refluxed 2 hours. The mixture is cooled, rendered basic with aqueous ammonium hydroxide and extracted with chloroform. These extracts are dried and evaporated to dryness to yield 3-(3-aminocinnamyl)-6-phenyl-1,2,3,4,5,6-hexahydro-2,6-methano-3-benzazocine which is further purified through recrystallization from methanol.

Example 5.—3-cinnamyl-6-phenyl-8-acetoxy-1,2,3,4,5,6-hexahydro-2,6-methano-3-benzazocine Eight grams of 2-cinnamyl-6-phenyl-1,2,3,4,5,6-hexahydro-2,6-methano-3-benzazocine-8-ol hydrochloride and 50 ml. of acetic anhydride are heated at 100° C. for one hour. At the end of this time, the solution is cooled, rendered basic by the addition of dilute aqueous sodium hydroxide and filtered. The solid thus collected is dissolved in ether and this ethereal solution filtered and then dried over sodium sulfate. Evaporation of the solvent then yields 3-cinnamyl-6-phenyl-8-acetoxy-1,2,3,4,5,6-hexahydro-2,6-methano-3-benzazocine.

Example 6

An aqueous solution suitable for injection is prepared as follows:

3-cinnamyl - 6 - phenyl - 1,2,3,4,5,6 - hexahydro-2,6-methano-3-benzazocine-8-ol hydrochloride __mg__ 100
Sodium citrate _____mg__ 37
Sodium chloride _____mg__ 10
Propylene glycol _____ml__ .15
Sterile distilled water, q.s. 100 ml.

Aliquots of the above solution suitable to deliver the desired dosage of the active ingredient are administered intramuscularly for relief of pain.

Example 7

Ingredient: Quantity/capsule, mg.
3-cinnamyl-6-phenyl - 1,2,3,4,5,6-hexahydro-2,6-
 Corn starch, U.S.P. _____ 290
 methano-3-benzazocine-8-ol _____ 10

The above ingredients are mixed and introduced into a two-piece hard gelatin No. 1 capsule. One such capsule is suitable for oral administration every three hours to deliver 10 mg. of active ingredient.

Example 8

Ingredient: Quantity/capsule, mg.
3-cinnamyl - 6 - phenyl-1,2,3,4,5,6-hexahydro-
 2,6-methano-3-benzazocine-8-ol _____ 10
 Corn starch, U.S.P. _____ 150
 Lactose, U.S.P. _____ 180
 Cab-O-Sil M-5 _____ 4
 Gelatin, U.S.P. _____ 5
 Magnesium stearate, U.S.P. _____ 1

The foregoing ingredients are thoroughly mixed and pressed into tablets suitable for oral administration of 10 mg. of active ingredient. The tablets may be scored to permit administration of fractional doses.

Example 9

A solution suitable for injection is prepared containing in each ml., .2 mg. of 3-cinnamyl-6-phenyl-11-methyl-1,2,3,4,5,6-hexahydro - 2,6 - methano-3-benzazocine-8-ol hydrochloride, 15 mg. of sodium citrate, 2.2 mg. of sodium bisulfite as a preservative and sterile distilled water, q.s. 1 ml.

Example 10

A solution of 3-cinnamyl-6-phenyl-1,2,3,4,5,6-hexahydro-2,6-methano-3-benzazocine-8-ol in methanol, heated if necessary, is treated with a molar equivalent amount of maleic acid in methanol. The mixture is warmed briefly, cooled and concentrated. The solid which forms is collected by filtration, washed with a little cold methanol and dried to yield 3-cinnamyl-6-phenyl-1,2,3,4,5,6-hexahydro-2,6-methano-benzazocine-8-ol maleate.

Other salts such as the tartrate, succinate, citrate and the like are formed in an analogous fashion.

What is claimed is:

1. A compound selected from the group consisting of a 1,2,3,4,5,6 - hexahydro - 6 - phenyl - 2,6 - methano - 3 - benzazocine of the formula:

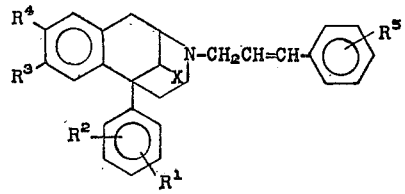

wherein each of $R^1$ and $R^2$ independent of the other, is hydrogen, halogen, (lower)alkyl, (lower)alkoxy, (lower)alkanoyloxy, hydroxy or trifluoromethyl; each of $R^3$ and $R^4$, independent of the other is hydrogen, hydroxy, (lower)alkoxy, or (lower)alkanoyloxy; $R^5$ is hydrogen, hydroxy, (lower)alkoxy, chloro, fluoro, bromo, (lower)alkyl or amino; and X is hydrogen or (lower)alkyl.

2. A compound according to claim 1 wherein each of $R^2$, $R^4$ and $R^5$ is hydrogen.

3. A compound according to claim 1 wherein the compound is 3 - cinnamyl - 6 - phenyl - 1,2,3,4,5,6 - hexahydro-2,6-methano-3-benzazocine-8-ol.

4. A compound according to claim 1 wherein the compound is 3 - cinnamyl - 6 - phenyl - 1,2,3,4,5,6 - hexahydro-2,6-methano-3-benzazocine.

5. A compound according to claim 1 wherein the compound is 3 - cinnamyl - 6 - phenyl - 8 - methoxy - 1,2,3,4,5,6-hexahydro-2,6-methano-3-benzazocine.

6. A compound according to claim 1 wherein the compound is 3 - cinnamyl - 6 - phenyl - 11 - methyl - 1,2,3,4,5,6-hexahydro-2,6-methano-3-benzazocine-8-ol.

7. A compound according to claim 1 wherein the compound is 3 - cinnamyl - 6 - phenyl - 11 - methyl - 1,2,3,4,5,6-hexahydro-2,6-methano-3-benzazocine.

8. A compound according to claim 1 wherein the compound is 3 - cinnamyl - 6 - phenyl - 8 - methoxy - 11-methyl - 1,2,3,4,5,6 - hexahydro - 2,6 - methano - 3 - benzazocine.

9. The pharmaceutically acceptable non-toxic acid addition salts of a compound according to claim 1.

10. A compound according to claim 1 wherein each of $R^1$, $R^2$ and $R^4$ is hydrogen and $R^3$ is hydrogen, hydroxy, or methoxy, X is hydrogen or methyl, and $R^5$ is hydrogen, hydroxy, methoxy, chloro or fluoro.

References Cited

UNITED STATES PATENTS 3,320,265  5/1967  Clarke _____ 260—240 XR

OTHER REFERENCES

Walker et al.: J. Org. Chem., vol. 31, pp. 1905–1911 (June 1966).

JOHN D. RANDOLPH, Primary Examiner.

U.S. Cl. X.R.

260—293, 294.7; 424—267

PO-1050
(5/69)

UNITED STATES PATENT OFFICE
CERTIFICATE OF CORRECTION

Patent No. 3,449,332  Dated  June 10, 1969

Inventor(s)  Frank H. Clarke, Jr. and Fred B. Block

It is certified that error appears in the above-identified patent and that said Letters Patent are hereby corrected as shown below:

In column 3, line 23, "sales" should be — salts —

In column 3, line 71, "8-ol" should appear before the semicolon (;).

In column 5, lines 49 and 50 are transposed and should appear as follows:

methano-3-benzazocine-8-ol . . . . 10
Corn starch, U.S.P. . . . . . . . . 290

SIGNED AND
SEALED
MAR 17 1970

(SEAL)
Attest:

Edward M. Fletcher, Jr.
Attesting Officer

WILLIAM E. SCHUYLER, JR.
Commissioner of Patents